(12) United States Patent
Suzuki et al.

(10) Patent No.: US 9,014,895 B2
(45) Date of Patent: Apr. 21, 2015

(54) VEHICLE CONTROL SYSTEM

(71) Applicant: Suzuki Motor Corporation, Shizuoka (JP)

(72) Inventors: Hidenori Suzuki, Shizuoka (JP); Seiji Bito, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 45 days.

(21) Appl. No.: 13/899,032

(22) Filed: May 21, 2013

(65) Prior Publication Data

US 2013/0332016 A1     Dec. 12, 2013

(30) Foreign Application Priority Data

Jun. 7, 2012   (JP) ................. 2012-130088

(51) Int. Cl.
| | |
|---|---|
| *B60W 30/00* | (2006.01) |
| *B60W 10/08* | (2006.01) |
| *B60W 10/30* | (2006.01) |
| *B60K 6/46* | (2007.10) |
| *B60W 10/06* | (2006.01) |
| *F02D 41/02* | (2006.01) |
| *F02N 11/08* | (2006.01) |
| *B60W 20/00* | (2006.01) |
| *F02D 41/08* | (2006.01) |

(52) U.S. Cl.
CPC .............. *B60W 30/00* (2013.01); *B60W 10/08* (2013.01); *B60W 10/30* (2013.01); *Y02T 10/6286* (2013.01); *Y02T 10/6217* (2013.01); *B60W 20/108* (2013.01); *B60K 6/46* (2013.01); *B60W 10/06* (2013.01); *B60W 2510/244* (2013.01); *B60W 2520/10* (2013.01); *F02N 2200/0804* (2013.01); *F02D 41/021* (2013.01); *F02D 41/083* (2013.01); *F02N 11/084* (2013.01); *F02D 2200/503* (2013.01); *F02N 2200/061* (2013.01); *Y02T 10/48* (2013.01)

(58) Field of Classification Search
USPC ....................................... 701/22, 36
See application file for complete search history.

(56) References Cited

U.S. PATENT DOCUMENTS

| | | | |
|---|---|---|---|
| 6,452,286 B1 * | 9/2002 | Kubo et al. ................. 290/40 C |
| 7,006,899 B2 * | 2/2006 | Wakao et al. ................. 700/286 |
| 7,010,400 B2 * | 3/2006 | Hisada et al. ................... 701/22 |
| 7,459,801 B2 * | 12/2008 | Shimoyama et al. ....... 290/40 B |
| 7,520,357 B1 * | 4/2009 | Huston ......................... 180/170 |
| 2006/0124275 A1 | 6/2006 | Gosse et al. |

FOREIGN PATENT DOCUMENTS

JP       2006-525899 A    11/2006

* cited by examiner

*Primary Examiner* — Mary Cheung
*Assistant Examiner* — Michael Berns
(74) *Attorney, Agent, or Firm* — Rothwell, Figg, Ernst & Manbeck, P.C.

(57) ABSTRACT

A control system for an electric vehicle equipped with a driving electric motor which is actuated by electric power, as supplied from a vehicle-driving battery, to drive a wheel of an electric vehicle, a power generating motor which is actuated by an engine to provide electric power to the vehicle-driving battery, and an air conditioner which works to regulate temperature in a cabin of the electric vehicle. The control system controls the engine so as to keep an output therefrom constant in response to an air condition request. The control system also keeps the output from the engine constant to actuate the power generating motor for charging the vehicle-driving battery when an amount of charge in the vehicle-driving battery is determined to be lower than or equal to a given threshold value, and the electric vehicle is determined to be at a stop.

7 Claims, 8 Drawing Sheets

VEHICLE CONTROL SYSTEM

CROSS REFERENCE TO RELATED DOCUMENT

The present application claims the benefit of priority of Japanese Patent Application No. 2012-130088 filed on Jun. 7, 2012, the disclosure of which is totally incorporated herein by reference.

BACKGROUND OF THE INVENTION

1. Technical Field of the Invention

The present invention relates generally to a control system designed to control an operation of an air conditioner and/or a generating motor in vehicles.

2. Background Art

Typical electric vehicles are not equipped with a combustion engine and thus are usually engineered to control an air conditioner in a cabin using a device such as PTC (Positive Temperature Coefficient) heater or an electric compressor which works to convert electric power of a vehicle-driving battery into heat. The activation of the air conditioner, therefore, results in a decrease in amount of charge in the vehicle-driving battery, which will lead to a decrease in cruising distance (also be called a distance-to-empty) of the vehicle.

Usually, when left unused for a long time, the vehicle-driving battery is self-discharged, thus causing the vehicle to be likely to be disabled.

There are known series-hybrid vehicles equipped with a vehicle-driving battery, a driving electric motor, a power generating engine, and a power generating electric motor. The series-hybrid vehicle work to drive the power generating electric motor using the power generating engine to supply electric power required to run the vehicle to the vehicle-driving motor and also to deliver an excess of the electric power to the vehicle-driving battery.

When the amount of electric energy remaining in the vehicle-driving battery (i.e., State Of Charge) is low, the series-hybrid vehicles need to secure the electric power required to run the vehicle only by means of the power generating engine. It is, thus, necessary to use the power generating engine and the power generating electric motor which are capable of producing a large amount of electric power.

The series-hybrid vehicles need to change the output of the power generating engine as a function of load on running them (which will also be referred to as a running load below). Accordingly, in the case where the power generating engine is implemented by an internal combustion engine, it will result in a decrease in fuel economy. Additionally, the output of the power generating engine (i.e., a driven condition of the vehicle) is, as described above, changed as a function of the running load, thus resulting in instability of the temperature of the power generating engine. It is, thus, difficult to effectively use the power generating engine as a power source for the air conditioner. For instance, it is difficult to utilize the thermal energy, as produced by the power generating engine, for air heating through the air conditioner.

Japanese Translation of PCT application, as listed below, teaches techniques for installing an auxiliary driving device for supplying the energy to an air conditioning system to heat a working fluid flowing through a heater core and controlling operations of an evaporator, a compressor, and a condenser.
Japanese Translation of PCT application No. 2006-525899

The electric vehicles, as described above, face the problem that the activation of the air conditioner results in a decrease in distance-to-empty of the vehicle. In order to alleviate such a problem, vehicles, such as the series-hybrid vehicles equipped with the power generating engine, may be designed to use the power generating engine for operating the air conditioner. However, the series-hybrid vehicles, as described above, usually change the engine power as a function of the running load, and thus encounter the problem of a decrease in fuel economy. The change in engine output also results in a difficulty in effectively utilizing the power generating engine as a power source for the air conditioner. Further, the series-hybrid vehicles require large-sized engine and generating motor.

The above publication only teaches activating the auxiliary drive device to supply the energy to the air conditioning system and is silent about control of the auxiliary drive device depending upon an operating condition of the vehicle. It is, therefore, impossible for the system, as disclosed in the above publication, to solve the problems from which the electric vehicles or series-hybrid vehicles suffer.

It is an object of the invention to provide a control system for a vehicle equipped with an engine for actuating an air conditioner which is designed to ensure stability in operation of the engine.

SUMMARY OF THE INVENTION

According to the first aspect of the invention, there is provided a control system for an electric vehicle equipped with a driving electric motor which is actuated by electric power, as supplied from a vehicle-driving battery, to drive a wheel of the electric vehicle, a power generating motor which is actuated by an engine to provide electric power to the vehicle-driving battery, and an air conditioner which works to regulate temperature in a cabin of the electric vehicle. The control system comprises: (a) an air condition controlling unit which controls an operation of the engine so as to keep an output therefrom at a given constant level to actuate the air conditioner in response to an air conditioning request; and (b) a charging control unit which controls the operation of the engine so as to keep the output at the given constant level to actuate the power generating motor for charging the vehicle-driving battery when an amount of charge in the vehicle-driving battery is determined to be lower than or equal to a given threshold value, and the electric vehicle is determined to be at a stop.

In the first preferred mode of the invention, the control system may also include an inverter which works to achieve power conversion between the driving electric motor and the vehicle-driving battery or between the power generating motor and the vehicle-driving battery.

According to the second aspect of the invention, there is provided a control system for an electric vehicle equipped with a driving electric motor which is actuated by electric power, as supplied from a vehicle-driving battery, to drive a wheel of an electric vehicle, a power generating motor which is actuated by an engine to provide electric power to the vehicle-driving battery, and an air conditioner which works to regulate temperature in a cabin of the electric vehicle. The control system comprises: (a) a driving inverter which works to achieve conversion of electric power, as supplied from the vehicle-driving battery, and deliver it to the driving electric motor; (b) a power generating inverter which works to achieve conversion of electric power, as supplied from the power generating motor, and deliver it to the vehicle-driving battery; (c) an air condition controlling unit which controls an operation of the engine so as to keep an output therefrom at a given constant level to actuate the air conditioner in response to an air conditioning request; and (d) a charging control unit which keeps the engine producing the output at the given constant level to actuate the power generating motor for charging the vehicle-driving battery while permitting the electric vehicle to run when an amount of charge in the vehicle-driving battery is determined to be lower than or equal to a given threshold value.

In the first preferred mode of the control system according to the second aspect of the invention, the driving inverter may be driven by electric power into which electric power, as supplied from the power generating motor, is converted by the power generating inverter, and then also converted by driving inverter. When the amount of charge in the vehicle-driving battery is determined to be lower than or equal to the given threshold value when the driving electric motor is operating to move the electric vehicle, the charging control unit may keep an output of the power generating motor below a maximum level and also charge the vehicle-driving battery.

In the preferred mode of the control system according to either of the first or second aspect of the invention, an engine stopping unit may also be provided which stops the engine when the amount of charge in the vehicle-driving battery is determined to be higher than the given threshold value, and no air conditioning request for the air conditioner is determined to be made.

The control system of the first aspect of the invention is designed to operate the engine as a power source for the air conditioner, thus resulting in no decrease in amount of charge in the vehicle-driving battery for actuating the air conditioner. Therefore, in the case where the vehicle-driving battery is used as a power source for moving the vehicle, the control system works to avoid a decrease in amount of charge in the vehicle-driving battery which leads to a decrease in distance the vehicle is permitted to travel.

The control system of the first aspect of the invention is also engineered to start the engine to charge the vehicle-driving battery through the power generating motor when the amount of charge in the vehicle-driving battery is determined to be lower than or equal to the given threshold value, and the electric vehicle is determined to be at a stop (e.g., when the vehicle is disabled to travel).

In the control system of the first aspect of the invention, the air conditioner and the power generating motor are a stable load, thus permitting specifications of the engine to be so set as to produce a constant output. This allows the engine to be reduced in size, which leads to a decreased amount of energy source (e.g., fuel) therefor. The heat emitted from the engine is also constant, thus improving the usability of the engine as a thermal source for air conditioner.

The control system in the first preferred mode has the inverter shared by the driving motor and the power generating motor and thus works to move the vehicle and charge the vehicle-driving battery without having to use two inverters one for each of the driving motor and the power generating motor. This permits the control system to be reduced in size and produced at a decreased cost.

The control system of the second aspect of the invention is designed to operate the engine as a power source for the air conditioner, thus resulting in no decrease in amount of charge in the vehicle-driving battery for actuating the air conditioner. Therefore, in the case where the vehicle-driving battery is used as a power source for moving the vehicle, the control system works to avoid a decrease in amount of charge in the vehicle-driving battery which leads to a decrease in distance the vehicle is permitted to travel.

In the control system of the second aspect of the invention, the air conditioner and the power generating motor are a stable load, thus permitting specifications of the engine to be so set as to produce a constant output. This allows the engine to be reduced in size, which leads to a decreased amount of energy source (e.g., fuel) therefor. The heat emitted from the engine is also constant, thus improving the usability of the engine as a thermal source for air conditioner. The control system is equipped with the power generating inverter and the driving inverter and thus works to charge the vehicle-driving battery using the power generating inverter when the amount of charge in the vehicle-driving battery is lower than or equal to the given threshold value and also actuate the driving motor using the driving inverter for driving the vehicle in response to a vehicle driving request during the charging of the vehicle-driving battery.

In the first preferred mode of the control system according to the second aspect of the invention, the vehicle-driving battery is permitted to be charged while the electric power, as produced by the power generating motor, is used directly in operating the vehicle-driving motor.

In the preferred mode of the control system according to either of the first or second aspect of the invention, the engine is prevented from being driven unnecessarily.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but is for the purpose of explanation and understanding only.

In the drawings.

DESCRIPTION OF THE PREFERRED EMBODIMENT

Embodiments of the invention will be described below with reference to drawings.

First Embodiment

A control system for an electric vehicle according to the first embodiment will be discussed.

An EV (Electric Vehicle) controller 60 works to control an operation of an electric vehicle 1. The electric vehicle 1, as referred to herein, is a series-hybrid vehicle.

Structure

Figure 1:
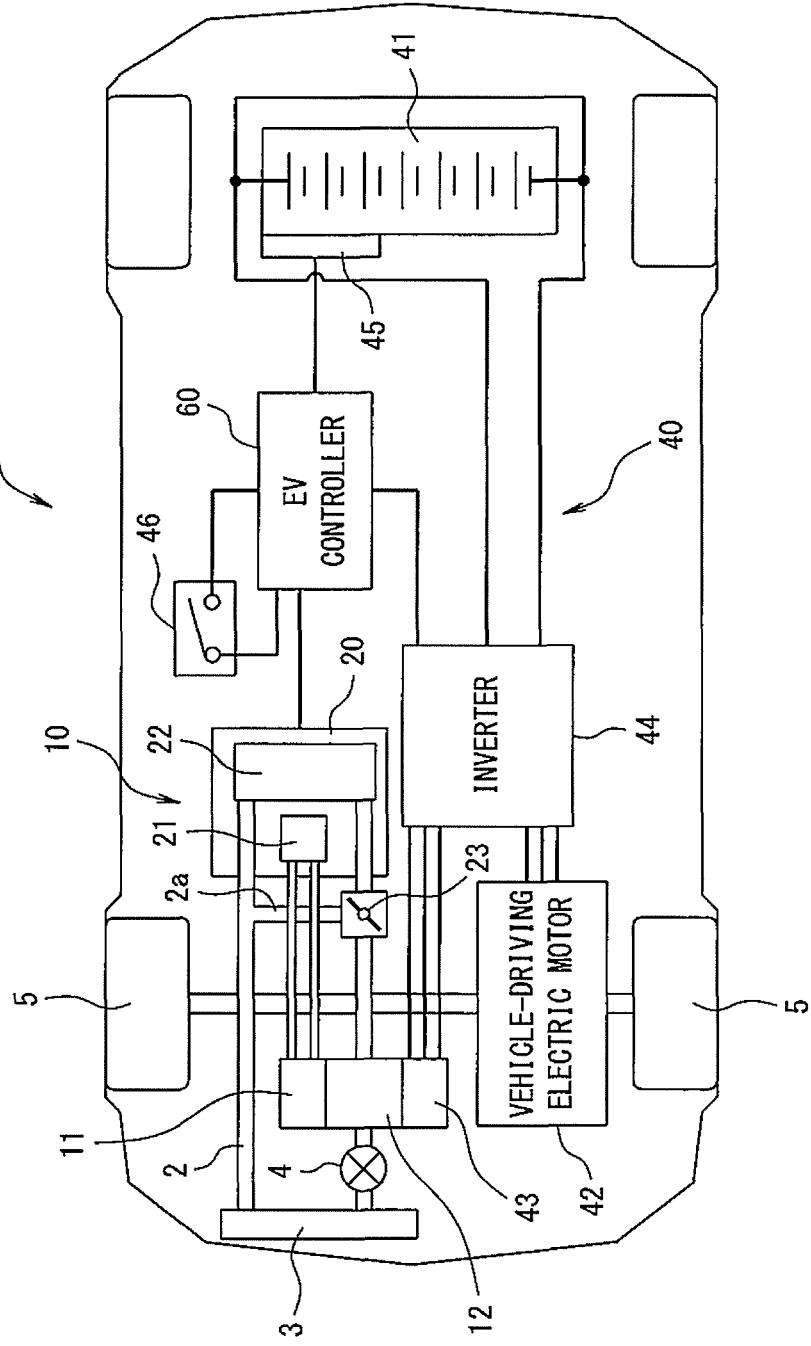
FIG. 1 is a schematic view which illustrates a control system for a vehicle according to the first embodiment of the invention.

FIG. 1 is a view which illustrates a structure of the vehicle 1 according to the first embodiment.

The vehicle 1 includes an air conditioning system 10 which establishes air conditioning in a cabin of the vehicle 1, a driver 40 which drives the vehicle 1, and the EV controller 60 which works to control an entire operation of the vehicle 1.

The air conditioning system 10 includes a compressor 11, an engine 12, an air conditioner 20 such as an air conditioning unit or an HVAC (Heating Ventilation and Air Conditioning) system.

The air conditioner 20 works to air-condition the cabin of the vehicle 1. The air conditioner 20 is equipped with an evaporator (or an evaporator core) 21, a heater core 22, and a flow selector valve 23.

The evaporator 21 serves to exchange thermal energy between a cooling medium, as compressed by the compressor 11 and a condenser (not shown) into liquid form at high temperature and high pressure, and air passing through the evaporator 21, thereby cooling and dehumidifying the air.

The heater core 22 is disposed in a heating medium flow path 2 through which a heating medium such as cooling water circulates. The heating medium flow path 2 connects a radiator 3, the engine 12, and the heater core 22 together in this order. A pressure pump 4 is interposed between the radiator 3 and the engine 12 in the heating medium flow path 2. The heating medium flow path 2 has a bypass path 2a connecting a portion between the engine 12 and an inlet of the heater core 22 and a portion downstream of an outlet of the heater core 22. The heating medium enters the inlet and discharges from the outlet of the heater core 22. The flow selector valve 23 is disposed between the engine 12 and the inlet of the heater core 22.

After passing through the radiator 3, the heating medium is fed by the pressure pump 4 to the engine 12 and then heated. The heated heating medium is delivered to the heater core 22 and circulated therethrough, thereby warming the air passing through the heater core 22. When the flow selector valve 23 is switched, the heating medium heated by the engine 12 is returned back to the radiator 3 through the bypass flow path 2a without being fed to the heater core 22.

The engine 12 is a compact engine. For instance, the displacement of the engine 12 is between 50 cc and 125 cc. The engine 12 functions as a drive source for activating the compressor 11 of the air conditioning system 10 and a power generating motor 43 of the driver 40. Specifically, the engine 12 works as a driving and electric power generating engine. The operation of the engine 12 is controlled by the EV controller 60.

The driver 40 is supplied with power from a vehicle-driving battery 41 and works to activate a vehicle-driving electric motor 42 to drive wheels 5 of the vehicle 1. The driver 40 is equipped with the vehicle-driving battery 41, the vehicle-driving electric motor 42, the power generating motor 43, an inverter 44, a battery SOC sensor 45, and an emergency power generation switch 46.

The power generating motor 43 is driven by the engine 12. The inverter 44 works to change ac power, as supplied from the power generating motor 43, into dc power and feed it to the vehicle-driving battery 41. The battery SOC sensor 45 works to measure the temperature of, electric current flowing from, and voltage at the vehicle-driving battery 41 and output signals indicative thereof to the EV controller 60.

The EV controller 60 analyzes the outputs from the battery SOC sensor 45 to control the operations of the engine 12, the power generating motor 43, and the inverter 44, thereby controlling the electric power transmitted among the power generating motor 43, the inverter 44, and the vehicle-driving battery 41. The power generating motor 43 is implemented by, for example, a compact electric motor of 1.5 kW to 5 kW.

The vehicle-driving electric motor 42 is supplied with the power from the vehicle-driving battery 41 through the inverter 44 to drive the wheels 5. The EV controller 60 samples the outputs from the battery SOC sensor 45 to control the operations of the vehicle-driving electric motor 42 and the inverter 44, thereby regulating the electric power transmitted among the vehicle-driving battery 41, the inverter 44, and the vehicle-driving electric motor 42.

As apparent from the above discussion, the inverter 44 is disposed between the power generating motor 43 and the vehicle-driving battery 41 and between the vehicle-driving electric motor 42 and the vehicle-driving battery 41. Specifically, the inverter 44 is shared between the power generating motor and the vehicle-driving electric motor 42.

The emergency power generation switch 46 is manually switched by a vehicle driver between an OFF-state and an ON-state to establish an emergency power generating mode.

The EV controller 60 is implemented by an ECU (Electronic Control Unit) made up of a microcomputer and its peripheral circuits. For example, the EV controller 60 includes a CPU, a ROM, and a RAM. The ROM stores therein one or two or more programs. The CPU executes the program(s) stored in the ROM to achieve given tasks.

The EV controller 60 serves as a controller to manage an entire operation of the vehicle 1.

Figure 2:
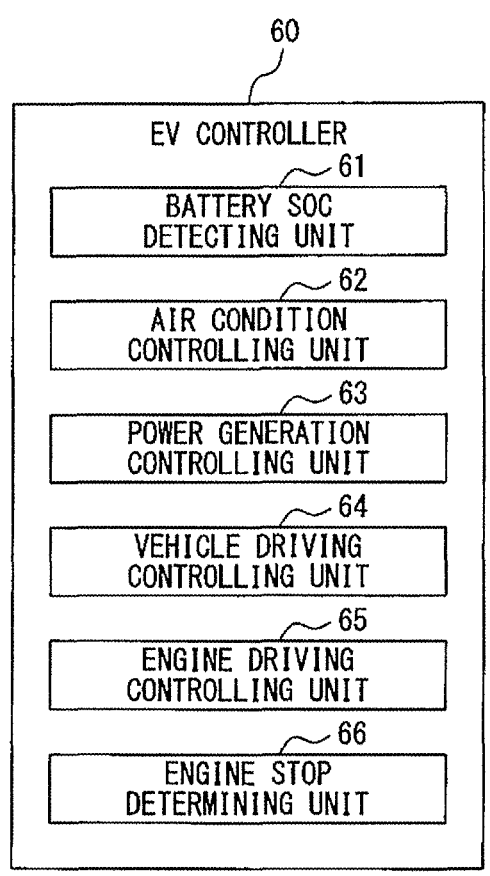
FIG. 2 is a block diagram which illustrates a structure of an EV controller of the control system of FIG. 1.

FIG. 2 is a functional block diagram which illustrates an internal structure of the EV controller 60.

The EV controller 60 includes a battery SOC detecting unit 61, an air condition controlling unit 62, a power generation controlling unit 63, a vehicle driving controlling unit 64, an engine driving controlling unit 65, and an engine stop determining unit 66.

The battery SOC detecting unit 61 works to determine the SOC (State Of Charge) of the vehicle-driving battery 41 based on the output from the battery SOC sensor 45. The air condition controlling unit 62 works to control the operation of the air conditioning system 10. The power generation controlling unit 63 works to control the operations of the engine 12, the power generating motor 43, and the inverter 44 in a power generating mode. The vehicle driving controlling unit 64 works to control the operations of the vehicle-driving electric motor 42 and the inverter 44 in a vehicle driving mode. For instance, the vehicle driving controlling unit 64 monitors a driver's effort on an accelerator pedal of the vehicle 1 (i.e., the position of the accelerator pedal) to control the operations of the vehicle-driving electric motor 42 and the inverter 44. The engine driving controlling unit 65 is responsive to a command from the power generation controlling unit 63 to control the operation of the engine 12. The engine stop determining unit 66 works to determine whether the power generation controlling unit 63 is in the emergency power generating mode or not and control the operation of the engine 12 in one of a heating mode and a cooling mode requested by the vehicle driver.

Figure 3:
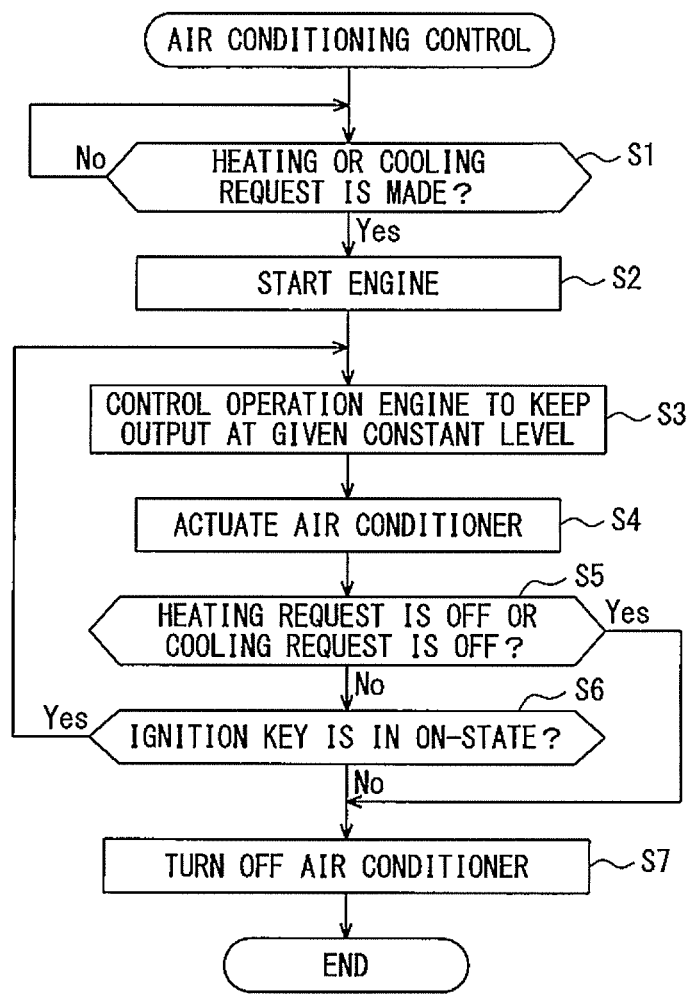
FIG. 3 is a flowchart of an air conditioning control program to be executed by an air condition controlling unit of the control system of FIG. 1.
Figure 4:
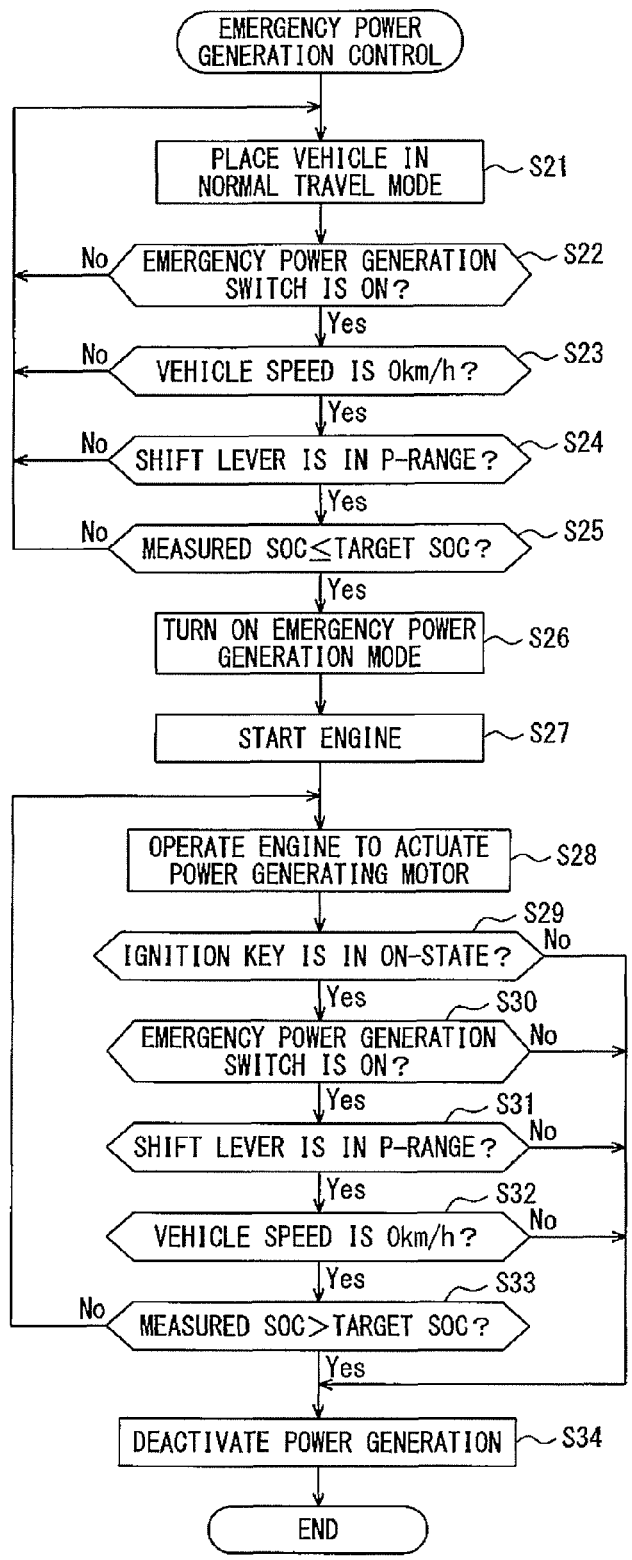
FIG. 4 is a flowchart of an emergency power generating control program to be executed by a power generation controlling unit of the control system of FIG. 1.
Figure 5:
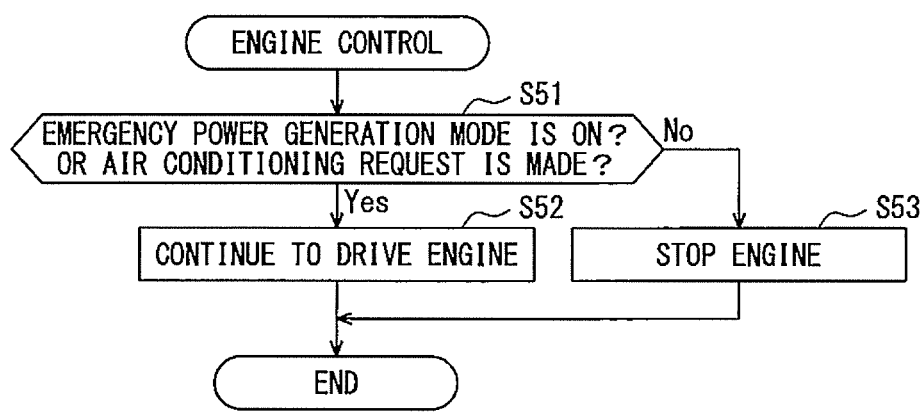
FIG. 5 is a flowchart of an engine control program to be executed by an engine stop determining unit of the control system of FIG. 1.

FIGS. 3 to 5 are flowcharts of sequences of logical steps or programs to be executed by the EV controller 60. FIG. 3 shows an air conditioning control program to be executed by the air condition controlling unit 62. FIG. 4 shows an emergency power generating control program to be executed by the power generation controlling unit 63. FIG. 5 shows an engine control program to be executed by the engine stop determining unit 66. The programs of FIGS. 3 to 5 are run simultaneously parallel to each other.

Tasks to be executed by the EV controller 60 according to the programs of FIGS. 3 to 5 will be described below in detail.

The air conditioning control program to be executed by the air condition controlling unit 62 will first be described below.

After entering the program, the routine proceeds to step S1 wherein the air condition controlling unit 62 determines whether a heating request or a cooling request has been made or not. Specifically, when the vehicle occupant has turned on the heating mode (e.g., a heating switch) of the air conditioner 20, the air conditioner 20 outputs a heating request to the EV controller 60. Alternatively, when the vehicle occupant has turned on the cooling mode (e.g., a cooling switch) of the air conditioner 20, the air conditioner 20 outputs a cooling request to the EV controller 60. The air condition controlling unit 62 is responsive to the heating request to determine that the heating mode has been turned on. Alternatively, the air condition controlling unit 62 is responsive to the cooling request to determine that the cooling mode has been turned on. If either of the heating mode or the cooing mode is determined to be turned on, the routine proceeds to step S2.

In step S2, the air condition controlling unit 62 starts the engine 12. Specifically, the air condition controlling unit 62 outputs an engine drive command to the engine driving controlling unit 65. The engine driving controlling unit 65 then starts the engine 12.

The routine proceeds to step S3 wherein the air condition controlling unit 62 or the engine driving controlling unit 65 controls the operation of the engine 12 to keep the output therefrom at a given constant level. For instance, the air condition controlling unit 62 or the engine driving controlling unit 65 continues to control the running of the engine 12 at an operating point most suitable for fuel economy of the engine 12 to keep the engine output constant.

When the engine 12 has already been started by the power generation controlling unit 63 and the engine driving controlling unit 65 in steps S27 and S28 of FIG. 4 which will be described later, it is kept operated regardless of the operations in steps S2 and S3.

The routine proceeds to step S4 wherein the air condition controlling unit 62 turns on the air conditioner 20. Specifically, when the heating request is determined to have been made in step S1, the air condition controlling unit 62 controls an open position of the flow selector valve 23 based on the temperature set by the vehicle occupant. This causes the heating medium, as heated by the engine 12, to be delivered to the heater core 22 by an amount, as determined as a function of the open position of the flow selector valve 23. The heater core 22 then warms the air passing therethrough and feeds it to the cabin of the vehicle 1. Alternatively, when the cooling request is determined to have been made in step S1, the air condition controlling unit 62 activates the compressor 11 to compress and liquidize the cooing medium. The cooling medium is then subjected to vaporization in the evaporator 21, thereby cooling the air flowing through the evaporator 21 and delivering it to the cabin of the vehicle 1.

The routine proceeds to step S5 wherein the air condition controlling unit 62 determines whether a heating-off request or a cooling-off request has been made or not. Specifically, the air condition controlling unit 62 monitors the operation of the air conditioner 20 and determines whether the heating mode or the cooling mode has been turned off or not. If a YES answer is obtained meaning that the heating request or the cooling off-request has been made, then the routine proceeds to step S7. Alternatively, if a NO answer is obtained, then the routine proceeds to step S6.

In step S6, the air condition controlling unit 62 determines whether an ignition key of the vehicle 1 is in an on-state or not. If a YES answer is obtained meaning that the ignition key is in the on-state, then the routine returns back to step S3. Alternatively, if a NO answer is obtained meaning that the ignition key is turned off, then the routine proceeds to step S7.

In step S7, the air condition controlling unit 62 deactivates the air conditioner 20. Specifically, when the heating-off request is determined to have been made in step S5, the air condition controlling unit 62 turns off the heating mode of the air conditioner 20. For instance, the air condition controlling unit 62 controls the open position of the flow selector valve 23 to stop delivering the heating medium, as heated by the engine 12, to the heater core 22, in other words, to make the heating medium pass only through the bypass path 2a. Alternatively, when the cooling-off request is determined to have been made in step S5, the air condition controlling unit 62 turns off the cooling mode of the air conditioner 20. For instance, the air condition controlling unit 62 stops operating the compressor 11. The routine then terminates.

Next, the emergency power generating control program to be executed by the power generation controlling unit 63 will be described below with reference to FIG. 4.

First, in step S21, the power generation controlling unit 63 performs a control task given in a normal travel mode. The normal travel mode is a mode to activate the vehicle-driving electric motor 42 through the inverter 44 to run the vehicle 1.

The routine then proceeds to step S22 wherein the power generation controlling unit 63 determines whether the emergency power generation switch 46 has been turned on or not. If a YES answer is obtained meaning that the emergency power generation switch 46 has been turned on, then the routine proceeds to step S23. Alternatively, if a NO answer is obtained meaning that the emergency power generation switch 46 is in an off-state, then the routine returns back to step S21.

The routine proceeds to step S23 wherein the power generation controlling unit 63 determines whether the speed of the vehicle 1 is 0 km/h or not, that is, whether the vehicle 1 is at a stop or not. If a YES answer is obtained meaning that the speed of the vehicle 1 is 0 km/h, then the routine proceeds to step S24. Alternatively, if a NO answer is obtained meaning that the speed of the vehicle 1 is not 0 km/h, that is, that the vehicle 1 is now traveling, then the routine returns back to step S21.

In step S24, the power generation controlling unit 63 determines whether a shift lever (also called a shift selector) of a transmission of the vehicle 1 is in a P (Park) range or not. If a YES answer is obtained meaning that the shift lever is in the P range, then the routine proceeds to step S25. Alternatively, if a NO answer is obtained meaning that the shift lever is not in the P range, then the routine returns back to step S21.

In step S25, the power generation controlling unit 63 determines whether the SOC of the vehicle-driving battery 41, as determined by the battery SOC detecting unit 61, is lower than or equal to a target SOC or not. The target SOC is the amount of charge in the vehicle-driving battery 41 which disables the vehicle 1 to move. For instance, the target SOC is determined experimentally, empirically, or theoretically. If a YES answer is obtained meaning that the SOC of the vehicle-driving battery 41 is lower than or equal to the target SOC, then the routine proceeds to step S26, that is, that the SOC of the vehicle-driving battery 41 has dropped to a level where the vehicle 1 is disabled to run or there is a high probability that it is impossible to run the vehicle 1, then the routine proceeds to step S26. Alternatively, if a NO answer is obtained meaning that the SOC of the vehicle-driving battery 41 is higher than the target SOC, that is, it permits the vehicle 1 to move, then the routine returns back to step S21.

In step S26, the power generation controlling unit 63 enters the emergency power generating mode. The routine then proceeds to step S27 wherein the power generation controlling unit 63 starts the engine 12. Specifically, the power generation controlling unit 63 outputs an engine starting command to the engine driving controlling unit 65 to activate the engine 12.

The routine proceeds to step S28 wherein the power generation controlling unit 63 or the engine driving controlling unit 65 controls the operation of the engine 12 to keep the output therefrom constant. For instance, the air condition controlling unit 62 or the engine driving controlling unit 65 controls the running of the engine 12 at an operating point most suitable for fuel economy of the engine 12. Specifically, the air condition controlling unit 62 or the engine driving controlling unit 65 performs the same task, as in the air condition controlling unit 62, to control the operation of the engine 12.

When the engine 12 has already been started by the air condition controlling unit 62 or the engine driving controlling unit 65 in steps S2 or S3 of FIG. 3, it is kept operated regardless of the operations in steps S27 and S28.

In step S28, the power generation controlling unit 63 also activates the power generating motor 43 to supply the electric power to the vehicle-driving battery 41 through the inverter 44.

The routine then proceeds to step S29 wherein the power generation controlling unit 63 determines whether the ignition key of the vehicle 1 is in the on-state or not. If a YES answer is obtained meaning that the ignition key is in the on-state, then the routine proceeds to step S30. Alternatively, if a NO answer is obtained meaning that the ignition key is in the off-state, then the routine proceeds to step S34.

In step S30, the power generation controlling unit 63 determines whether the emergency power generation switch 46 is in the on-state or not. If a YES answer is obtained meaning that the emergency power generation switch 46 is in the on-state, then the routine proceeds to step S31. Alternatively, if a NO answer is obtained meaning that the emergency power generation switch 46 is in the off-state, then the routine proceeds directly to step S34.

In step S31, the power generation controlling unit 63 determines whether the shift lever of the transmission is in the P-range or not. If a YES answer is obtained meaning that the shift lever is in the P-range, then the routine proceeds to step S32. Alternatively, if a NO answer is obtained meaning that the shift lever is out of the P-range, then the routine proceeds to step S34.

In step S32, the power generation controlling unit 63 determines whether the speed of the vehicle 1 is 0 km/h or not. If a YES answer is obtained meaning that the vehicle 1 is at a stop, then the routine proceeds to step S33. Alternatively, if a NO answer is obtained meaning that the speed of the vehicle 1 is not 0 km/h, that is, that the vehicle 1 is now traveling, then the routine proceeds directly to step S34.

In step S33, the power generation controlling unit 63 determines whether the SOC of the vehicle-driving battery 41, as determined by the battery SOC detecting unit 61, is greater than the target SOC or not. If a YES answer is obtained meaning that the SOC of the vehicle-driving battery 41 is greater than the target SOC, then the routine proceeds to step S34. Alternatively, if a NO answer is obtained meaning that the SOC of the vehicle-driving battery 41 is lower than or equal to the target SOC, then the routine returns back to step S28.

In step S34, the power generation controlling unit 63 stops generating the electric power. Specifically, the power generation controlling unit 63 deactivates the power generating motor 43 and also turns off the emergency power generating mode. The routine then terminates.

The engine control program to be executed by the engine stop determining unit 66 will be described below with reference to FIG. 5.

The engine control program is run simultaneously in parallel to the air conditioning control program of FIG. 3 and the emergency power generating control program of FIG. 4. The air conditioning control program and the emergency power generating control program both activate the engine 12 to their respective control tasks, as described above. Specifically, the engine stop determining unit 66 executes the engine control program of FIG. 5 to achieve the air conditioning mode and the emergency power generating mode cooperatively with each other, thereby controlling the operating condition of the engine 12 properly.

In step S51 of FIG. 5, the engine stop determining unit 66 determines whether the emergency power generating mode is entered or not or whether an air conditioning request is made or not. When either of the heating request or the cooling request is made, the engine stop determining unit 66 decides that the air conditioning request is made.

If a YES answer is obtained in step S51 meaning that the emergency power generating mode is entered or the air conditioning request is made, that is, that there is a request to operate the engine 12 in either of the emergency power generating mode or the air conditioning mode, then the routine proceeds to step S52. Alternatively, if a NO answer is obtained meaning that there is no request to operate the engine 12 in either of the emergency power generating mode or the air conditioning mode, then the routine proceeds to step S53.

In step S52, the engine stop determining unit 66 continues to operate the engine 12. The routine then terminates.

In step S53, the engine stop determining unit 66 stops the engine 12. The routine then terminates.

Operation and Effect

Next, the operations of the vehicle 1 and beneficial effects offered thereby according to the first embodiment will be described below.

Air Heating

When the vehicle occupant turns on the air heating switch of the air conditioner 20, and the air conditioner 20 outputs the heating request to the EV controller 60, the EV controller 60 starts to control the operation of the engine 12 so as to produce a given constant power and also regulates the open position of the flow selector valve 23 as a function of the temperature set by the vehicle occupant (i.e., steps S1 to S4). This causes the heating medium, as heated by the engine 12, to be delivered to the heater core 22 by an amount, as determined as a function of the open position of the flow selector valve 23. The air passing through the heater core 22 is, therefore, warmed by the heating medium and then discharged into the cabin of the vehicle 1.

When the vehicle occupant turns off the air heating switch of the air conditioner 20 or the ignition key of the vehicle 1, the EV controller 60 deactivates the heating mode to stop heating the air (i.e., steps S5 to S7).

As apparent from the above discussion, the control system of the first embodiment works to warm up the cabin of the vehicle 1 using the thermal energy, as produced by the engine 12, without consuming the electric energy stored in the vehicle-driving battery 41. The activation of the air conditioner 20 in the hearing mode, therefore, does not result in consumption of electric power stored in the vehicle-driving battery 41 and thus in no decrease in distance-to-empty of the vehicle 1.

Air Cooling

When the vehicle occupant turns on the air cooling switch of the air conditioner 20, and the air conditioner 20 outputs the cooing request to the EV controller 60, the EV controller 60 starts to control the operation of the engine 12 so as to produce a given constant power to drive the compressor 11 (i.e., steps S1 to S4). The compressor 11 is supplied with the power from the engine 12 and compresses and liquidizes the cooling medium. The cooling medium is then vaporized by the evaporator 21, thereby cooling the air flowing through the evaporator 21. The cooled air is discharged into the cabin of the vehicle 1.

When the vehicle occupant turns off the air cooling switch of the air conditioner 20 or the ignition key of the vehicle 1, the EV controller 60 deactivates the cooling mode to stop cooling the air (i.e., steps S5 to S7).

The control system of the first embodiment, as described above, works to cool the cabin of the vehicle 1 using the output from the engine 12, without consuming the electric energy stored in the vehicle-driving battery 41. The activation of the air conditioner 20 in the cooling mode, therefore, does not result in consumption of electric power stored in the vehicle-driving battery 41 and thus in no decrease in distance-to-empty of the vehicle 1.

Electric Power Generation

When the amount of charge in the vehicle-driving battery 41 drops, so that the vehicle occupant turns on the emergency power generation switch 46 in the normal travel mode in the condition where the vehicle 1 is parked with the shift lever in the P-range, and the SOC of the vehicle-driving battery 41, as measured by the battery SOC sensor 45, is lower than or equal to the target SOC, the EV controller 60 enters the emergency power generating mode (i.e., steps S21 to S26). The EV controller 60 then starts the engine 12 to drive the power generating motor 43 (i.e., steps S27 to S28) to charge the vehicle-driving battery 41.

Afterwards, when the ignition key is turned off, the emergency power generation switch 46 is turned off, the shift lever of the transmission is moved out of the P-range, the vehicle 1 starts to run, or the SOC of the vehicle-driving battery 41 increases above the target SOC, the EV controller 60 stops generating the electric power (i.e., steps S29 to S34).

For instance, when the vehicle-driving battery 41 is left uncharged for a long time, so that the amount of charge remaining in the vehicle-driving battery 41 drops undesirably, thereby causing the vehicle 1 to be disabled, and thus the vehicle occupant turns on the emergency power generation switch 46, the vehicle 1 works to create the electric power through the engine 12 and the power generating motor 43 to charge the vehicle-driving battery 41 up to the target SOC so that the vehicle 1 can be powered by the vehicle-driving battery 41.

For example, the vehicle 1 may set the target SOC to a value which permits the vehicle 1 to travel a desired distance (e.g., 20 km) and increase the SOC of the vehicle-driving battery 41 in the power generating mode up to the target SOC. This permits the vehicle 1 to move to at least a charging point.

The fact that the vehicle 1 is at a stop is one of the conditions to initiate the emergency power generating mode to produce the electric power using the power generating motor 43 (i.e., steps S23 and S32). This is because the inverter 44 is used to operate the vehicle-driving electric motor 42 when the vehicle 1 is traveling, thus not permitting the inverter 44 to be used in generating the electric power to charge the vehicle-driving battery 41 through the power generating motor 43, while when the vehicle 1 is parked, the inverter 44 needs not be operated to drive the vehicle driving electric motor 42, thus permitting the inverter 44 to be used to generate the electric power through the power generating motor 43 to supply it to the vehicle-driving electric motor 42.

Specifically, the vehicle 1 is designed to drive the vehicle-driving electric motor 42 using the inverter 44 or supply the electric power, as produced by the power generating motor 43, to the vehicle-driving battery 41. This permits the control system of the vehicle 1 to be reduced in size or manufactured at low costs.

The power generating motor 43 and the air conditioner 20 are a stable load (i.e., a constant load) on the engine 12, thus permitting the specifications of the engine 12 to be so set as to produce a constant output. This allows the engine 12 to be reduced in size, which leads to a decreased amount of energy source (e.g., fuel) therefor.

Cooperation Between Air Conditioning Control and Power Generating Control

The EV controller 60 establishes cooperation between the air conditioning control and the power generating control to control the operation of the engine 12 (see FIG. 5). Specifically, when the emergency power generating mode is entered, or the air conditioning request is made, the EV controller 60 continues to drive the engine 12 (i.e., steps S51 and S52).

Therefore, when the emergency power generating mode is still entered, but the air conditioning request is cancelled, while the engine 12 is being driven to operate both the air conditioner 20 and the power generating motor 43, the EV controller 60 continues to drive the engine 12. Alternatively, when the air conditioning request is still made, but the EV controller 60 is brought out of the emergency power generating mode while the engine 12 is being driven to operate both the air conditioner 20 and the power generating motor 43, the EV controller 60 continues to drive the engine 12.

When the emergency power generating mode is turned off, and the air conditioning request is turned off, the EV controller 60 stops the engine 12 (i.e., steps S51 and S53). Specifically, when the SOC of the vehicle-driving battery 41, as measured by the SOC sensor 45, increases over the target SOC, so that the emergency power generating mode is turned off (i.e., steps S33 and S34), and the air conditioning request is cancelled, the EV controller 60 stops driving the engine 12. Therefore, for example, when the engine 12 is driven to operate both the air conditioner 20 and the power generating motor 43, but the air condition controlling unit 62 and the power generation controlling unit 63 both withdraw a request for driving the engine 12, the EV controller 60 stops the engine 12.

Accordingly, when the engine 12 is used for air conditioning and electric power generating in the above cooperative control between the air conditioning mode and the emergency power generating mode, the EV controller 60 does not deactivate the engine 12 to stop the air conditioning and the power generation against the driver's intention. In other words, the EV controller 60 prevents the engine 12 from being driven unnecessarily.

Second Embodiment

The second embodiment will be described below.

The vehicle 1 is equipped with two inverters for the power generating motor 43 and the vehicle-driving electric motor 42 to produce the electric power while the vehicle 1 is traveling.

Figure 6:
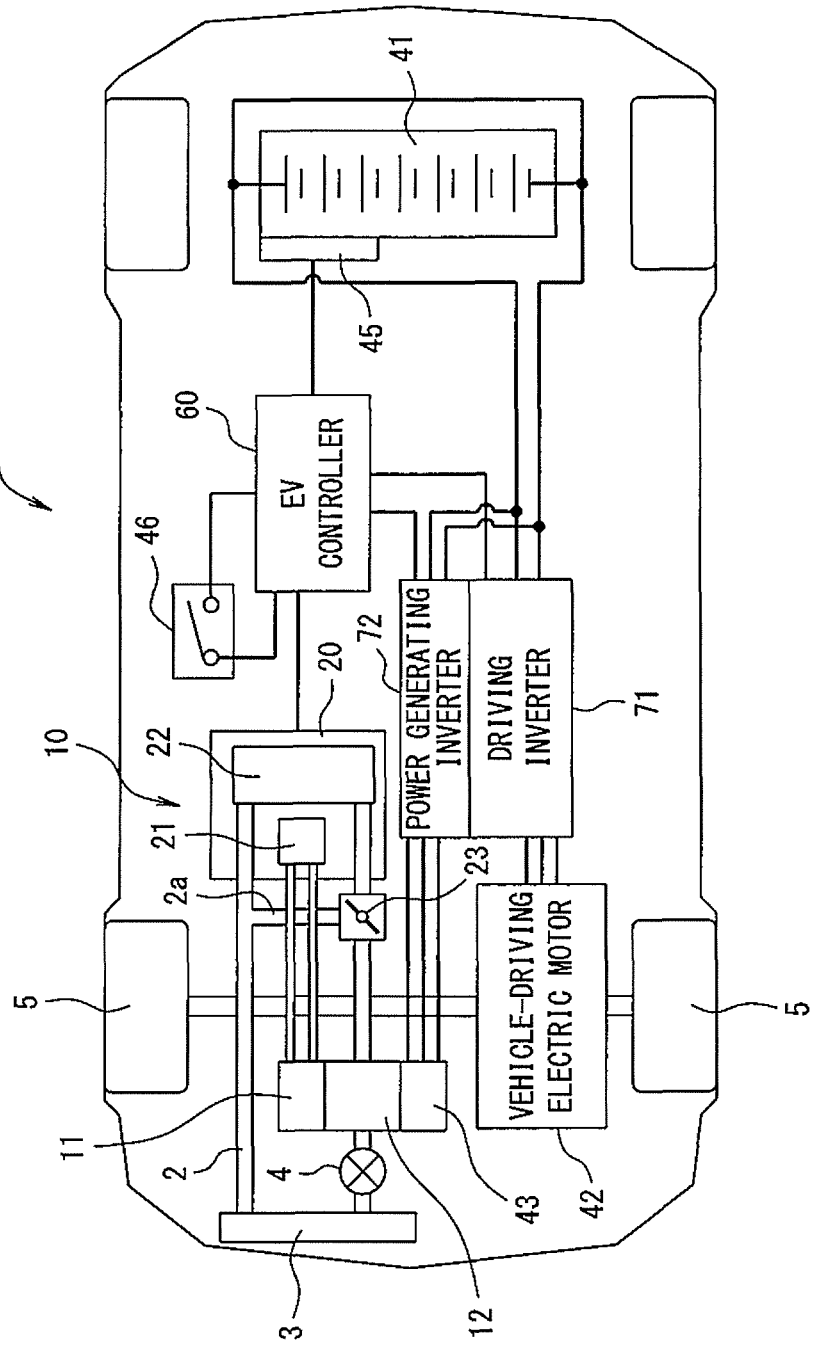
FIG. 6 is a schematic view which illustrates a control system for a vehicle according to the second embodiment of the invention.

FIG. 6 is a schematic view which illustrates a structure of the vehicle 1 according to the second embodiment.

The vehicle 1 is equipped with a driving inverter 71 for the vehicle-driving electric motor 42 and a power generating inverter 72 for the power generating motor 43. The EV controller 60 works to control operations of the driving inverter 71 and the power generating inverter 72. In order to drive the vehicle driving electric motor 42 using the electric power, as produced by the power generating motor 43, the power generating motor 43 is designed to produce a power which is higher in level than that in the first embodiment. For instance, the power generating motor 43 is implemented by an electric motor of 5 kw to 10 kw. The engine 12 is implemented by an internal combustion engine whose displacement (e.g., 125 cc to 250 cc) is greater than that in the first embodiment.

Figure 7:
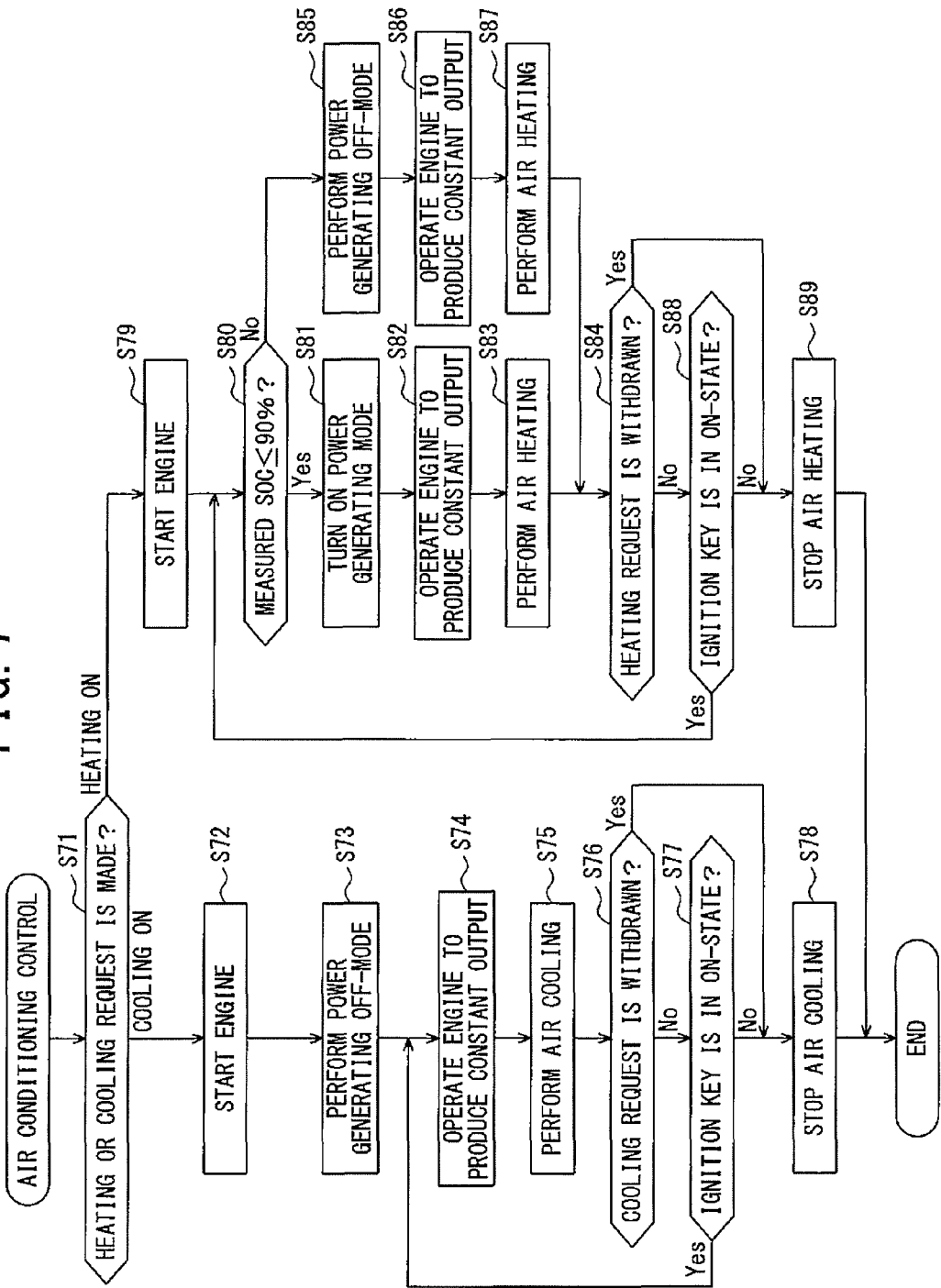
FIG. 7 is a flowchart of an air conditioning control program to be executed by an air condition controlling unit of the control system of FIG. 6.
Figure 8:
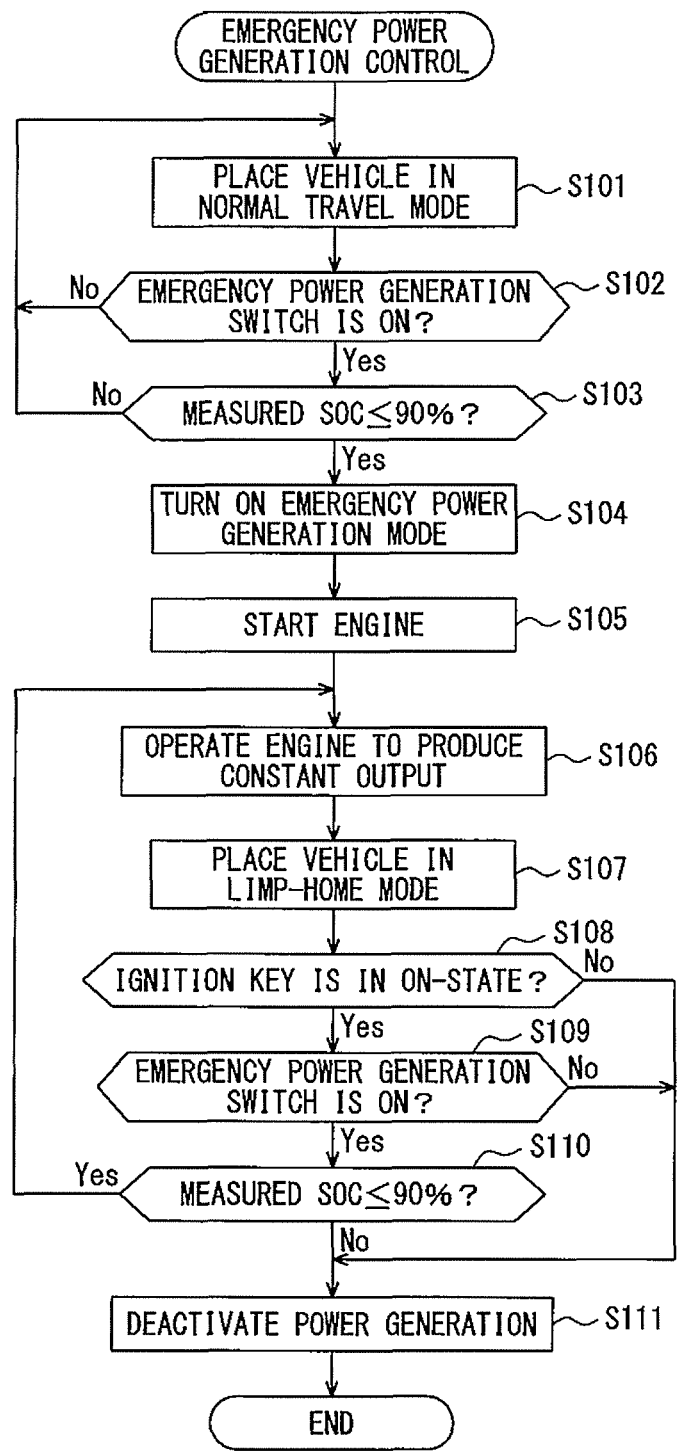
FIG. 8 is a flowchart of an emergency power generating control program to be executed by a power generation controlling unit of the control system of FIG. 6.

FIG. 7 is a flowchart of an air conditioning control program to be executed by the air condition controlling unit 62. FIG. 8 is a flowchart of an emergency power generating control program to be executed by the power generation controlling unit 63. The engine stop determining unit 66 in the second embodiment executes the same program as illustrated in FIG. 5. The programs of FIGS. 5, 7, and 8 are run simultaneously parallel to each other.

The air conditioning control program of FIG. 7 to be executed by the air condition controlling unit 62 will be described below.

After entering the program, the routine proceeds to step S71 wherein the air condition controlling unit 62 determines whether a heating request or a cooling request has been made or not. If the heating request has been made, then the routine proceeds to step S79. Alternatively, if the cooling request has been made, then the routine proceeds to step S72.

In step S72, the air condition controlling unit 62 starts the engine 12.

The routine proceeds to step S73 wherein the air condition controlling unit 62 enters a power generation off-mode. Specifically, the air condition controlling unit 62 inhibits the power generating motor 43 from being driven to produce electric power. If an operation in step S106 of FIG. 8, as will be described later, has already requested to start the power generating motor 43 to produce the electric power, the air condition controlling unit 62 permits the power generating motor 43 to continue to be activated.

The routine proceeds to step S74 wherein the air condition controlling unit 62 or the engine driving controlling unit 65 controls the operation of the engine 12 to produce the output therefrom at a given constant level. When operations in steps S105 and S106 of FIG. 8, as will be described later, have requested to start the engine 12 through the power generation controlling unit 63 and the engine driving controlling unit 65, it is permitted to continue.

The routine proceeds to step S75 wherein the air condition controlling unit 62 starts to cool the air. Specifically, the air condition controlling unit 62 activates the compressor 11 to compress and liquidize the cooing medium to cool the cabin of the vehicle 1.

The routine proceeds to step S76 wherein the air condition controlling unit 62 determines whether the cooling request has been withdrawn or not. If a YES answer is obtained meaning that the cooling request has been withdrawn, then the routine proceeds directly to step S78. Alternatively, if a NO answer is obtained meaning that the cooling request continues to be made, then the routine proceeds to step S77.

In step S77, the air condition controlling unit 62 determines whether the ignition key of the vehicle 1 is in the on-state or not. If a YES answer is obtained meaning that the ignition key is in the on-state, then the routine returns back to step S74. Alternatively, if a NO answer is obtained meaning that the ignition key is turned off, then the routine proceeds to step S78.

In step S78, the air condition controlling unit 62 turns off the air conditioner 20 to stop cooling the air. Specifically, the air condition controlling unit 62 turns off the compressor 11. The routine then terminates.

In step S79, the air condition controlling unit 62 starts the engine 12.

The routine then proceeds to step S80 wherein the air condition controlling unit 62 determines whether the SOC of the vehicle-driving battery 41, as measured by the SOC sensor 45, is lower than or equal to a given upper limit or not. The upper limit is so selected as to limit the power generation for avoiding overcharging of the vehicle-driving battery 41. The upper limit is greater than the target SOC in the first embodiment. For instance, the upper limit is set to 90%. If a YES answer is obtained meaning that the SOC is lower than or equal to the upper limit (SOC≤upper limit), then the routine proceeds to step S81. Alternatively, if a NO answer is obtained meaning that the SOC is greater than the upper limit (SOC>upper limit), then the routine proceeds to step S85.

In step S81, the air condition controlling unit 62 enters the power generating mode. Specifically, the air condition controlling unit 62 activates the power generating motor 43 to produce the electric power. For instance, the air condition controlling unit 62 outputs a power generation command to the power generation controlling unit 63 to turn on the power generating motor 43 and the power generating inverter 72.

The routine then proceeds to step S82 wherein the air condition controlling unit 62 or the engine driving controlling unit 65 controls the operation of the engine 12 to keep the output therefrom constant.

The routine then proceeds to step S83 wherein the air condition controlling unit 62 starts to warm the air in the cabin of the vehicle 1. Specifically, the air condition controlling unit 62 controls the open position of the flow selector valve 23 as a function of the temperature set by the vehicle occupant.

The routine then proceeds to step S84 wherein the air condition controlling unit 62 determines whether the heating request has been withdrawn or not. If a YES answer is obtained meaning that the heating request has been withdrawn, then the routine proceeds directly to step S89. Alternatively, if a NO answer is obtained meaning that the heating request continues to be made, then the routine proceeds to step S88.

In step S88, the air condition controlling unit 62 determines whether the ignition key of the vehicle 1 is in the on-state or not. If a YES answer is obtained meaning that the ignition key is in the on-state, then the routine returns back to step S80. Alternatively, if a NO answer is obtained meaning that the ignition key is turned off, then the routine proceeds to step S89.

In step S89, the air condition controlling unit 62 turns off the air conditioner 20 to stop warning the air. Specifically, the air condition controlling unit 62 stops controlling the position of the flow selector valve 43 in the heating mode. The routine then terminates.

In step S85, the air condition controlling unit 62 enters the power generating off-mode. Specifically, the air condition controlling unit 62 inhibits the power generating motor 43 from being driven to produce electric power.

The routine proceeds to step S86 wherein the air condition controlling unit 62 or the engine driving controlling unit 65 controls the operation of the engine 12 to keep the output therefrom at the given constant level.

The routine then proceeds to step S87 wherein the air condition controlling unit 62 starts to warm the air in the cabin of the vehicle 1. Specifically, the air condition controlling unit 62 controls the open position of the flow selector valve 23 as a function of the temperature set by the vehicle occupant. The routine then proceeds to step S84.

Next, the emergency power generating control program to be executed by the power generation controlling unit 63 will be described below with reference to FIG. 8.

First, in step S101, the power generation controlling unit 63 performs the control task given in the normal travel mode.

The routine then proceeds to step S102 wherein the power generation controlling unit 63 determines whether the emergency power generation switch 46 is in the on-state or not. If a YES answer is obtained meaning that the emergency power generation switch 46 has been turned on, then the routine proceeds to step S103. Alternatively, if a NO answer is obtained meaning that the emergency power generation switch 46 is in an off-state, then the routine returns back to step S101.

In step S103, the power generation controlling unit 63 determines whether the SOC of the vehicle-driving battery 41, as determined by the battery SOC detecting unit 61, is lower than or equal to an upper limit of, for example, 90% or not. If a YES answer is obtained meaning that the SOC of the vehicle-driving battery 41 is lower than or equal to the upper limit (SOC≤upper limit), then the routine proceeds to step S104. Alternatively, if a NO answer is obtained meaning that the SOC of the vehicle-driving battery 41 is higher than the upper limit (SOC>upper limit), then the routine returns back to step S101.

In step S104, the power generation controlling unit 63 enters the emergency power generating mode.

The routine then proceeds to step S105 wherein the power generation controlling unit 63 starts the engine 12.

The routine proceeds to step S106 wherein the power generation controlling unit 63 or the engine driving controlling unit 65 controls the operation of the engine 12 to keep the output therefrom at the given constant level.

When the operations of steps S72 and S74 or steps 79 and S82 or steps S79 and S86 have already started the engine 12 through the air condition controlling unit 62 and the engine driving controlling unit 65, it is permitted to continue regardless of the operations in steps S105 and S106.

In step S106, the power generation controlling unit 63 also activates the power generating motor 43 to generate and deliver the electric power to the vehicle-driving battery 41 through the vehicle driving inverter 72.

The routine proceeds to step S107 wherein when there is a request to move the vehicle 1, the power generation controlling unit 63 activates the so-called limp-home mode in which the vehicle 1 is controlled to travel at a minimal required speed.

Specifically, in step S107, when it is required to run the vehicle 1, the power generation controlling unit 63 supplies the electric power, as produced by the power generating motor 43, to the vehicle-driving electric motor 42 through the power generating inverter 72 and the driving inverter 71. The electric power, as created by the power generating motor 43, is converted in sequence by the power generating inverter 72 and the driving inverter 71 and then fed to the vehicle-driving electric motor 42.

The power generation controlling unit 63 charges the vehicle-driving battery 41 while controlling the operation of the power generating motor 43 so that the output therefrom may be kept below a maximum level thereof. The vehicle driving controlling unit 64 is, thus, subjected to the limitation of supply of the electric power from the power generating motor 43 so that it limits the operation of the vehicle-driving electric motor 42, thereby placing the vehicle in the limp-home mode in which driving conditions such as acceleration, maximum speed, etc. are controlled.

In the limp-home mode, the power generation controlling unit 63 controls the operation of the power generating motor 43 so as to keep the output constant independently of a driver's driving request such as a driver's effort on the accelerator pedal. The power generation controlling unit 63 delivers an excess of the electric power, which has not been utilized to move the vehicle 1 in the limp-home mode, that is, not consumed by the vehicle driving electric motor 42, to charge the vehicle-driving battery 41.

The routine proceeds to step S108 wherein the power generation controlling unit 63 determines whether the ignition key of the vehicle 1 is in the on-state or not. If a YES answer is obtained meaning that the ignition key is in the on-state, then the routine proceeds to step S109. Alternatively, if a NO answer is obtained meaning that the ignition key is in the off-state, then the routine proceeds to step S111.

In step S109, the power generation controlling unit 63 determines whether the emergency power generation switch 46 is in the on-state or not. If a YES answer is obtained meaning that the emergency power generation switch 46 is in the on-state, then the routine proceeds to step S110. Alternatively, if a NO answer is obtained meaning that the emergency power generation switch 46 is in the off-state, then the routine proceeds directly to step S111.

In step S110, the power generation controlling unit 63 determines whether the SOC of the vehicle-driving battery 41, as determined by the battery SOC detecting unit 61, is lower than or equal to an upper limit of, for example, 90% or not. If a YES answer is obtained meaning that the SOC of the vehicle-driving battery 41 is lower than or equal to the upper limit (SOC≤upper limit), then the routine returns back to step S106. Alternatively, if a NO answer is obtained meaning that the SOC of the vehicle-driving battery 41 is higher than the upper limit (SOC>upper limit), then the routine proceeds to step S111.

In step S111, the power generation controlling unit 63 stops generating the electric power. Specifically, the power generation controlling unit 63 deactivates the power generating motor 43 and also turns off the emergency power generating mode. The routine then terminates.

Operation and Effect

Next, the operations of the vehicle 1 and beneficial effects offered thereby according to the second embodiment will be described below.

Air Cooling

When the vehicle occupant turns on the air cooling switch of the air conditioner 20, and the air conditioner 20 outputs the cooling request to the EV controller 60, the EV controller 60 starts to control the operation of the engine 12 so as to produce a given constant power and also activates the compressor 11 to cool the air (i.e., steps S71 to S75). The EV controller 60 is placed in the power generation off-mode and inhibits the power generating motor 43 from being activated to produce the electric power (i.e., step S73).

When the vehicle occupant turns off the air cooling switch of the air conditioner 20 or the ignition key of the vehicle 1, the EV controller 60 deactivates the cooling mode to stop cooling the air (i.e., steps S76 to S78).

As apparent from the above discussion, in the cooling mode, the control system of the second embodiment works to cool the cabin of the vehicle 1, like in the first embodiment, using the power, as produced by the engine 12, without consuming the electric energy stored in the vehicle-driving battery 41. The activation of the air conditioner 20 in the cooling mode, therefore, does not result in consumption of electric power stored in the vehicle-driving battery 41 and thus in no decrease in distance-to-empty of the vehicle 1.

In the cooling mode, the EV controller 60 also inhibits the power generating motor 43 from being activated to produce the electric power. This is because a primary purpose for operating the engine 12 in the cooling mode is to drive the compressor 11. The activation of the power generating motor 43 in generating the electric power results in an increase in load on the engine 12, which will lead to an increase in consumption of fuel in the engine 12. Such an increased consumption will result in a decrease in operable time for which the engine 12 is permitted to run provided that the engine 12 is to be driven to cool the air. The EV controller 60 of the second embodiment is, as described above, engineered to inhibit the power generating motor 43 from being driven in the cooling mode, thereby avoiding a decrease in operable time to cool the air.

Air Heating

When the vehicle occupant turns on the air heating switch of the air conditioner 20, and the air conditioner 20 outputs the heating request to the EV controller 60, the EV controller 60 starts to control the operation of the engine 12 so as to produce a given constant power, thereby warming the air (i.e., steps S79 to S83 and steps S85 to S87). Specifically, when the SOC of the vehicle-driving battery 41 is lower than or equal to the upper limit, the EV controller 60 enters the power generating mode to turn on the power generating motor 43 and also drives the engine 12 to warm the air (i.e., steps S80 to S83). Alternatively, when the SOC of the vehicle-driving battery 41 is higher than the upper limit, the EV controller 60 enters the power generating off-mode to inhibit the power generating motor 43 to be activated and also drives the engine 12 to warm the air (i.e., steps S80 and S85 to S87).

When the vehicle occupant turns off the air heating switch of the air conditioner 20 or the ignition key of the vehicle 1, the EV controller 60 deactivates the heating mode to stop heating the air (i.e., steps S84 to S89).

Specifically, like in the first embodiment, the EV controller 60 works to warm the cabin of the vehicle 1 using the thermal energy, as created by the engine 12, without consuming the electric energy stored in the vehicle-driving battery 41. The activation of the air conditioner 20 in the hearing mode, therefore, does not result in consumption of electric power stored in the vehicle-driving battery 41 and thus in no decrease in distance-to-empty of the vehicle 1.

When the SOC of the vehicle-driving battery 41 is lower than or equal to the upper limit, the EV controller 60 runs the engine 12 and also activates the power generating motor 43 to warm the air, that is, operates the power generating motor 43 using the power, as produced by the engine 12 which is run to heat the heating medium, thus improving the usability of the engine 12 to charge the vehicle-driving battery 41.

Alternatively, when the SOC of the vehicle-driving battery 41 is higher than the upper limit, the EV controller 60 inhibits the power generating motor 43 from being activated, but permits the engine 12 to be driven to warm the air, thereby preventing the SOC from exceeding the upper limit greatly, which may result in overcharging of the vehicle-driving battery 41.

Electric Power Generation

When the amount of charge in the vehicle-driving battery 41 becomes low, so that the vehicle occupant turns on the emergency power generation switch 46 in the normal travel mode, and the SOC of the vehicle-driving battery 41, as measured by the battery SOC sensor 45, is lower than or equal to the upper limit, the EV controller 60 enters the emergency power generating mode (i.e., steps S101 to S104). The EV controller 60 then starts the engine 12 to drive the power generating motor 43, thereby charging the vehicle-driving battery 41 (i.e., steps S105 and S106). The EV controller 60 then switches the normal travel mode to the limp-home mode (i.e., step S107).

When the ignition key is turned off, the emergency power generation switch 46 is turned off, or the SOC exceeds the upper limit, the EV controller 60 stops producing the electric power (i.e., steps S108 to S111).

The vehicle 1 of the second embodiment is, as described above, equipped with the power generating motor 43 which is higher in output level than that in the first embodiment, the engine 12 which is greater in displacement than in the first embodiment, and the power generating inverter 72 and the driving inverter 71 which are separate from each other in order to achieve the limp-home mode. When entering the limp-home mode, the EV controller 60 output a command to the power generating inverter 72 so that the output of the power generating motor 43 may be kept below the maximum level thereof, thereby limiting the driving conditions of the vehicle 1 such as acceleration, maximum speed, etc. The power generation controlling unit 63 controls the operation of the power generating motor 43 so as to keep its output constant in the power generating mode independently of a driver's driving request such as a driver's effort on the accelerator pedal, thus improving the usability of the engine 12 and permitting the control scheme of the EV controller 60 to be simplified.

The power generating motor 43 and the air conditioner 20 are, like in the first embodiment, a stable load (i.e., a constant load) on the engine 12, thus permitting the specifications of the engine 12 to be so set as to produce a constant output. This allows the engine 12 to be reduced in size, which leads to a decreased amount of energy source (e.g., fuel) therefor, and also enables the air conditioner 20 to use heat emitted from the engine 12 as a thermal source for air conditioning.

Cooperation Between Air Conditioning Control and Power Generating Control

The EV controller 60 establishes cooperation between the air conditioning control and the power generating control to control the operation of the engine 12 (see FIG. 5). Specifically, when the emergency power generating mode is entered, or the air conditioning request is made, the EV controller 60 continues to drive the engine 12 (i.e., steps S51 and S52).

Therefore, when the air conditioning request is still made, but the EV controller 60 is brought out of the emergency power generating mode while the engine 12 is being driven to operate both the air conditioner 20 and the power generating motor 43, the EV controller 60 continues to drive the engine 12. Alternatively, when the emergency power generating mode is still entered, but the air conditioning request is withdrawn while the engine 12 is being driven to operate both the air conditioner 20 and the power generating motor 43, the EV controller 60 continues to drive the engine 12. Consequently, even when the air conditioning request is cancelled while the vehicle 1 is in the limp-home mode, that is, the power generating motor 43 is in operation, the EV controller 60 is permitted to continue to place the vehicle 1 in the limp-home mode.

When the emergency power generating mode is turned off, and the air conditioning request is turned off, the EV controller 60 stops the engine 12 (i.e., steps S51 and S53). Specifically, when the SOC of the vehicle-driving battery 41, as measured by the SOC sensor 45, increases over the upper limit (>target SOC), so that the emergency power generating mode is turned off (i.e., steps S110 and S111), and the air conditioning request is turned off, the EV controller 60 stops driving the engine 12. Therefore, for example, when the engine 12 is driven to operate both the air conditioner 20 and the power generating motor 43, but the air conditioner 20 and the power generation controlling unit 63 both withdraw a request for driving the engine 12, the EV controller 60 stops the engine 12.

Accordingly, when the engine 12 is used for air conditioning and electric power generating in the above cooperative control between the air conditioning mode and the emergency power generating mode, the EV controller 60 functions to avoid deactivation of the engine 12 to stop the air conditioning and the power generation against the driver's intention. In other words, the EV controller 60 prevents the engine 12 from being driven unnecessarily.

The power generation controlling unit 63 serves as, for example, a charging control unit. The engine stop determining unit 66 serves as, for example, an engine stopping unit. The EV controller 60 serves as, for example, a control system for the vehicle 1.

Modifications of Embodiments

In the second embodiment, the EC controller 60 starts to charge the vehicle-driving battery 41, that is, turns on the emergency power generating mode when the condition where the SOC of the vehicle-driving battery 41 is lower than or equal to the upper limit is encountered (i.e., step S103), but the EV controller 60 may be designed to start the charging when the SOC is lower than or equal to the target SOC.

The EV controller 60 starts to charge the vehicle-driving battery 41, that is, turns on the emergency power generating mode when the condition where the vehicle occupant turns on the emergency power generation switch 46 is encountered, but the EV controller 60 may be designed to start the charging when the SOC of the vehicle-driving battery 41 drops, so that it is impossible to move the vehicle 1. Specifically, the EV controller 60 works to detect the fact that the vehicle-driving battery 41 is lacking the power to drive the vehicle 1 and then starts the engine 12 and the electric power generating motor 43 to charge the vehicle-driving battery 41 automatically.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A control system for an electric vehicle equipped with a driving electric motor which is actuated by electric power, as supplied from a vehicle-driving battery, to drive a wheel of an electric vehicle, a power generating motor which is actuated by an internal combustion engine to provide electric power to the vehicle-driving battery, and an air conditioner which works to regulate temperature in a cabin of the electric vehicle, comprising:

an air condition controlling unit which is configured to control driving of the internal combustion engine based on the preset operating point and control an operation of the internal combustion engine so as to keep an output therefrom at a given constant level to actuate the air conditioner in response to an air conditioning request; and a charging control unit which is configured to determine an amount of charge in the vehicle-driving battery and that the electric vehicle is at a stop, and control driving of the internal combustion engine based on a preset operating point and control the operation of the internal combustion engine so as to keep the output at the given constant level to actuate the power generating motor for charging the vehicle-driving battery when the amount of charge in the vehicle-driving battery is determined to be lower than or equal to a given threshold value, and the electric vehicle is determined to be at a stop.

2. A control system as set forth in claim 1, further comprising an inverter which is configured to convert power between the driving electric motor and the vehicle-driving battery or between the power generating motor and the vehicle-driving battery.

3. A control system as set forth in claim 1, further comprising an engine stopping unit which is configured to stop the internal combustion engine when the amount of charge in the vehicle-driving battery is determined to be higher than the given threshold value, and no air conditioning request for the air conditioner is determined to be made.

4. A control system for an electric vehicle equipped with a driving electric motor which is actuated by electric power, as supplied from a vehicle-driving battery, to drive a wheel of an electric vehicle, a power generating motor which is actuated by an internal combustion engine to provide electric power to the vehicle-driving battery, and an air conditioner which works to regulate temperature in a cabin of the electric vehicle, comprising:

a driving inverter which is configured to convert electric power, as supplied from the vehicle-driving battery, and deliver it to the driving electric motor;

a power generating inverter which is configured to convert electric power, as supplied from the power generating motor, and deliver it to the vehicle-driving battery;

an air condition controlling unit which is configured to drive the internal combustion engine based on a preset operating point and control operation of the internal combustion engine so as to keep an output therefrom at a given constant level to actuate the air conditioner in response to an air conditioning request; and a charging control unit which is configured to determine an amount of charge in the vehicle-driving battery and keep the internal combustion engine producing the output at the given constant level to actuate the power generating motor for charging the vehicle-driving battery while permitting the electric vehicle to run when the amount of charge in the vehicle-driving battery is determined to be lower than or equal to a given threshold value.

5. A control system as set forth in claim 4, wherein the driving inverter is driven by electric power into which electric power, as supplied from the power generating motor, is converted by the power generating inverter, and then also converted by the driving inverter, and wherein when the amount of charge in the vehicle-driving battery is determined to be lower than or equal to the given threshold value when the driving electric motor is operating to move the electric vehicle, the charging control unit works to keep an output of the power generating motor below a maximum level and also to charge the vehicle-driving battery.

6. A control system as set forth in claim 4, further comprising an engine stopping unit which stops the internal combustion engine when the amount of charge in the vehicle-driving battery is determined to be higher than the given threshold value, and no air conditioning request for the air conditioner is determined to be made.

7. A control system according to claim 4, wherein the charging control unit is configured to determine that the electric vehicle is at a stop.

* * * * *